(12) United States Patent
Sulzbach et al.

(10) Patent No.: US 6,261,486 B1
(45) Date of Patent: Jul. 17, 2001

(54) PROCESS AND DEVICE FOR THE PRODUCTION OF POLYURETHANE MOLDINGS BY THE SHOT PROCESS

(75) Inventors: Hans-Michael Sulzbach, Königswinter; Ferdinand Althausen, Neunkirchen-Seelscheid, both of (DE)

(73) Assignee: Hennecke GmbH, Leverkusen (DE)

( * ) Notice: Subject to any disclaimer, the term of this patent is extended or adjusted under 35 U.S.C. 154(b) by 0 days.

(21) Appl. No.: 09/357,434

(22) Filed: Jul. 20, 1999

(30) Foreign Application Priority Data

Jul. 29, 1998 (DE) .............................. 198 34 101

(51) Int. Cl.[7] .............................. B29C 45/13; B29B 7/66
(52) U.S. Cl. .................................. 264/37.27; 264/328.6; 422/234; 425/217; 425/543; 366/160.2
(58) Field of Search .............................. 366/160.1, 160.2, 366/160.3; 422/234, 235; 264/37.27, 328.2, 328.6; 425/4 R, 217, 543

(56) References Cited

U.S. PATENT DOCUMENTS

| | | | |
|---|---|---|---|
| 2,788,953 | 4/1957 | Schneider | 259/4 |
| 3,180,350 | 4/1965 | Rill, Jr. et al. | 137/240 |
| 3,908,862 | * 9/1975 | Chandra et al. | 264/37.27 |
| 4,008,829 | * 2/1977 | Chandra et al. | 264/328.6 |
| 4,170,440 | 10/1979 | Gusmer et al. | 417/426 |
| 4,171,163 | 10/1979 | Hawkins | 366/145 |
| 4,199,303 | * 4/1980 | Gusmer et al. | 417/216 |
| 4,426,348 | * 1/1984 | Salisbury | 264/328.6 |
| 4,430,287 | 2/1984 | Tilgner | 264/40.6 |
| 4,795,336 | * 1/1989 | Shannon et al. | 264/328.6 |
| 4,885,125 | * 12/1989 | Kato et al. | 264/328.6 |
| 5,027,978 | 7/1991 | Roeser | 222/63 |
| 5,187,001 | * 2/1993 | Brew | 264/37.27 |
| 5,614,135 | * 3/1997 | Maleczek | 264/40.4 |

OTHER PUBLICATIONS

Kunststoff Handbuch [Plastics Handbook], vol. 7, "Polyurethane [Polyurethanes]", Carl Hanser–Verlag Munich/Vienna, 1983, pp. 121 to 168. No translation.

* cited by examiner

Primary Examiner—Jill L. Heitbrink
(74) Attorney, Agent, or Firm—Joseph C. Gil; Noland J. Cheung

(57) ABSTRACT

For the production of polyurethane moldings by the shot process from isocyanate and polyol components, the production is improved in that, in addition to the conditioning already known for the line system, at least one of the commercially available but modified metering pumps is also conditioned in that some of the reaction component made available flows in circulation through the intermediate space between the enclosed metering component and housing of the pump.

11 Claims, 2 Drawing Sheets

PROCESS AND DEVICE FOR THE PRODUCTION OF POLYURETHANE MOLDINGS BY THE SHOT PROCESS

FIELD OF THE INVENTION

The invention relates to a process and a device for the production of polyurethane moldings by the shot process by simultaneously metering at least one isocyanate component and at least one polyol component, which are metered into a mixing unit and mixed with one another in predetermined amounts during the shot times and then introduced into a mold, wherein at least one of the components is being metered into the mixing unit via a metering pump having a metering component during the shot times and being conveyed in circulation during the idle times.

BACKGROUND OF THE INVENTION

It is generally known with such processes to take measures so that the reaction components arrive at the mixing operation in the conditioned state and also conditioning the line system itself, so that defect-free moldings can be produced. A constant temperature of the reaction components and of the system from the beginning through the entire operating time and having constant and reproducible pressures immediately before and during the shot time are important for the conditioning.

When there are volume changes in the line system due to changes in pressure during operation, these are referred to "breathing" of the system. However, volume also depends on its thermal expansion. Maintaining the temperature conditions presents substantial problems over long idle or even standstill times. For the production of a molding with lesser requirements, a gear pump or a spiral pump is used as the metering unit. To produce moldings of higher precision, it is essential to use a high-speed metering reciprocating pump, for example, a series reciprocating pump or an axial or radial reciprocating pump. For viscous and filler-containing reaction components, reciprocating metering apparatuses are used. Mixing heads with ejection pistons are used, in particular, as the mixing unit. According to such a process, the production process is conventionally controlled semiautomatically or completely automatically wherein a central control apparatus of the device acts on the pumps, such as pre-pressure pumps, feed pumps, metering pumps or optionally, reciprocating metering apparatuses, as well as on the valves, such as shut-off valves, optionally, throttle valves and reversing valves, and optionally, on the control pistons or the jet needles of a mixing unit. Such a device is, as a rule, the metering and mixing component of an installation, to which a component carrying several molds, for example a circular table, also belongs. A central control apparatus can also be assigned to the entire installation, or a second control apparatus coupled to the first control apparatus is provided for the component carrying the molds. (See, generally, Kunststoff Handbuch [Plastics Handbook], volume 7"Polyurethane [Polyurethanes]", Carl Hanser-Verlag Munich/Nienna, 1983, pages 121 to 168).

Therefore, conditioning of the metering pump has not been taken into consideration when conditioning the device.

As a general rule, the metering pump has an enclosed metering component, such as, for example, an axial reciprocating metering pump with several pistons and cylinders. This enclosed metering component is surrounded by a pump housing, wherein an intermediate space between the housing and metering component is present to collect liquid, which has leaked out.

It has been found that the metering pump, which is of stable construction per se, or its metering component, is likewise subjected to the influence of temperature. Although the temperature-controlled reaction component has an effect on the metering component in terms of temperature from the inside during metering, towards the outside there is a temperature gradient which depends on the ambient temperature, which varies. The intrinsic heating of the pump also has an adverse effect in this connection.

SUMMARY OF THE INVENTION

The object of the invention is to keep the contents volume, which is the volume of the metering component of the metering pump filled by the reaction component, constant during the entire operating time by conditioning this metering component, and thus, to ensure defect-free production of moldings.

DETAILED DESCRIPTION OF THE INVENTION

Figure 1:
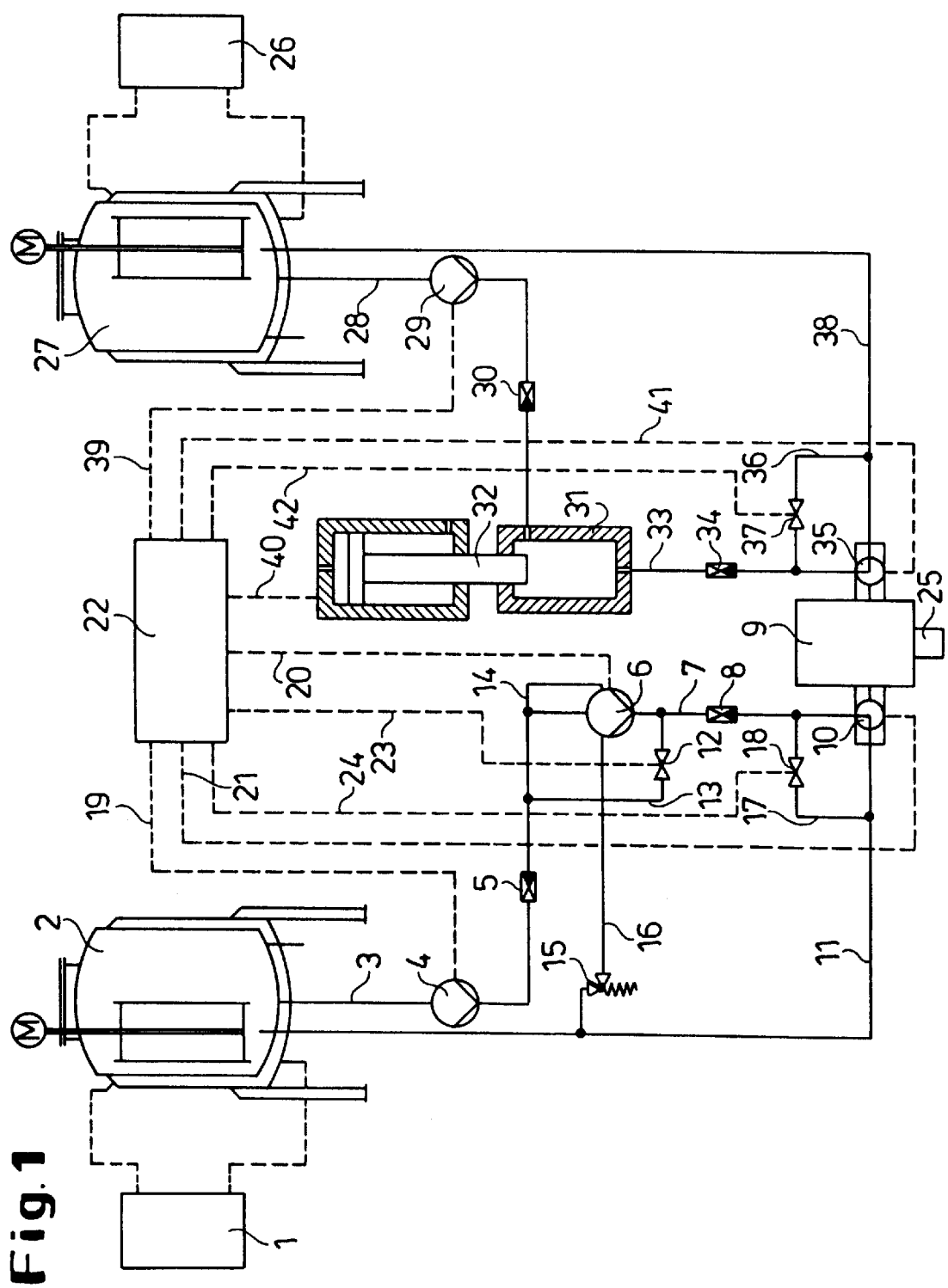
FIG. 1 shows a diagram of the entire device.

For clarity, the new invention is described below only for one of the reaction components.

In the present invention, during the metering times, a pre-pressure pump upstream of the metering pump operates during the entire operating time and conveys a larger amount of the component than is required by the metering pump during the metering times. A portion of the component made available is circulated, during the entire operating time, through an intermediate space formed between the metering component and the housing of the metering pump.

As a result, the actual metering component is kept at the working temperature not only from the inside by the portion of component content to be metered, but also from the outside. The "breathing" of the metered volume of the metering pump caused by pressure differences with respect to time is also suppressed, even though these resulting variations in volume are minimal or as a rule can be ignored.

Various procedure possibilities result from the invention.

According to a preferred embodiment of the process of the present invention, during the metering times, a smaller amount of the component made available by the pre-pressure pump is conveyed through the intermediate space in the metering pump when compared with during the idle times.

Preferably, some of the amount of component made available is occasionally circulated in the bypass line located after the metering pump.

This process variant is particularly favorable because, depending on the procedure, the excess amount of component delivered by the pre-pressure pump can be led back in circulation via this bypass, at least in part and optionally occasionally, i.e., during the idle times, which has a positive effect on the stability of the parameters, in particular, during the metering or shot times.

According to another embodiment, it may be advantageous to feed the total amount of component made available through the intermediate space of the housing in the idle times.

In such a case, no feeding in the bypass line would be necessary.

Preferably, the metering pump operates only during the metering times.

This has the advantage of saving energy, and is possible because the line system connecting to the metering pump is indeed conditioned before the shot by the circulation of the component or of the acting content of component past the metering pump.

Alternatively, the metering pump operates continuously during the operating times, the reversing valve being reversed at the start of the metering operation and then opening from the previous return position into the mixing chamber. In this case, however, the metering pump is exposed to increased wear because it is constantly operating.

The new device for the production of polyurethane moldings in a mold from at least one isocyanate component and at least one polyol component by the so-called shot process comprises, per component:
 a) a reservoir tank;
 b) a feed line leading from the reservoir tank via a metering unit and a reversing valve to a mixing unit, at least one of the metering units comprising a metering pump,
 c) a circulating line leading back from the reversing valve to the reservoir tank, wherein
 d) the metering pump is connected to the mixing unit via the reversing valve during the shot times, and a mold downstream of the mixing unit and a control apparatus for the valves and pumps.

Additionally, the improvement of the present invention comprises a:
 e) a pre-pressure pump is arranged upstream of the metering pump, which operates continuously during the operating time;
 f) a branch line of the feed line leading to the metering pump leads into the intermediate space, of the housing, surrounding the metering component and merges from this housing into the return line.

It is an implicit prerequisite in the present invention that, as is conventional, shut-off or throttle valves are optionally provided in the important lines, so that as many as possible or all of the process variants described above can be implemented with the new device. The line system can be designed here for maximum throughput, and adjustable throttle valves serve to optimize the process. Shut-off and throttle valves can be manually adjustable as required. It is customary, however, to adjust the device during start-up, and then for later automation of the production process through an automatic operation by means of the control unit, preferably in accordance with a predetermined program representing the sequence of the individual consecutive process steps. In the same manner, the pumps and optionally, the control piston of the mixing unit are connected such that they can be controlled by the control apparatus.

According to a preferred embodiment of the new device, a bypass line which bypasses the metering pump, branches off from the feed line leading to the metering pump and merges into the feed line.

Also, a shut-off valve and/or throttle valve preferably serve an embodiment for selecting the process steps described above.

The metering pump preferably comprises a gear pump, a spiral pump or a high-speed axial reciprocating pump or radial reciprocating pump, as is generally known. It is only important that the metering pump has a metering component which is surrounded by a housing, the intermediate space formed being provided with the feed and discharge of the branch line. In conventional metering pumps, such an intermediate space is present as a collecting space for leaks and is provided with drain openings. Its function can be converted accordingly.

In pursuance of the new concept of conditioning of the pump, for its use it would be possible also to provide the known reciprocating metering apparatuses with a housing, so that the reciprocating metering apparatus substantially comprising a piston and cylinder forms the metering component, which is surrounded by the housing, leaving an intermediate space provided with a feed and discharge for the branch line. However, this embodiment, which technically is indeed advantageous and possible, will probably be denied realization for cost reasons.

The new device of the present invention is shown purely in diagram form in the drawing and is explained in more detail below. The new device is constructed here such that it can be operated according to as many process variants as possible. In the drawing:

Where possible, the same reference symbols have been used for the same features in the two figures.

Figure 2:
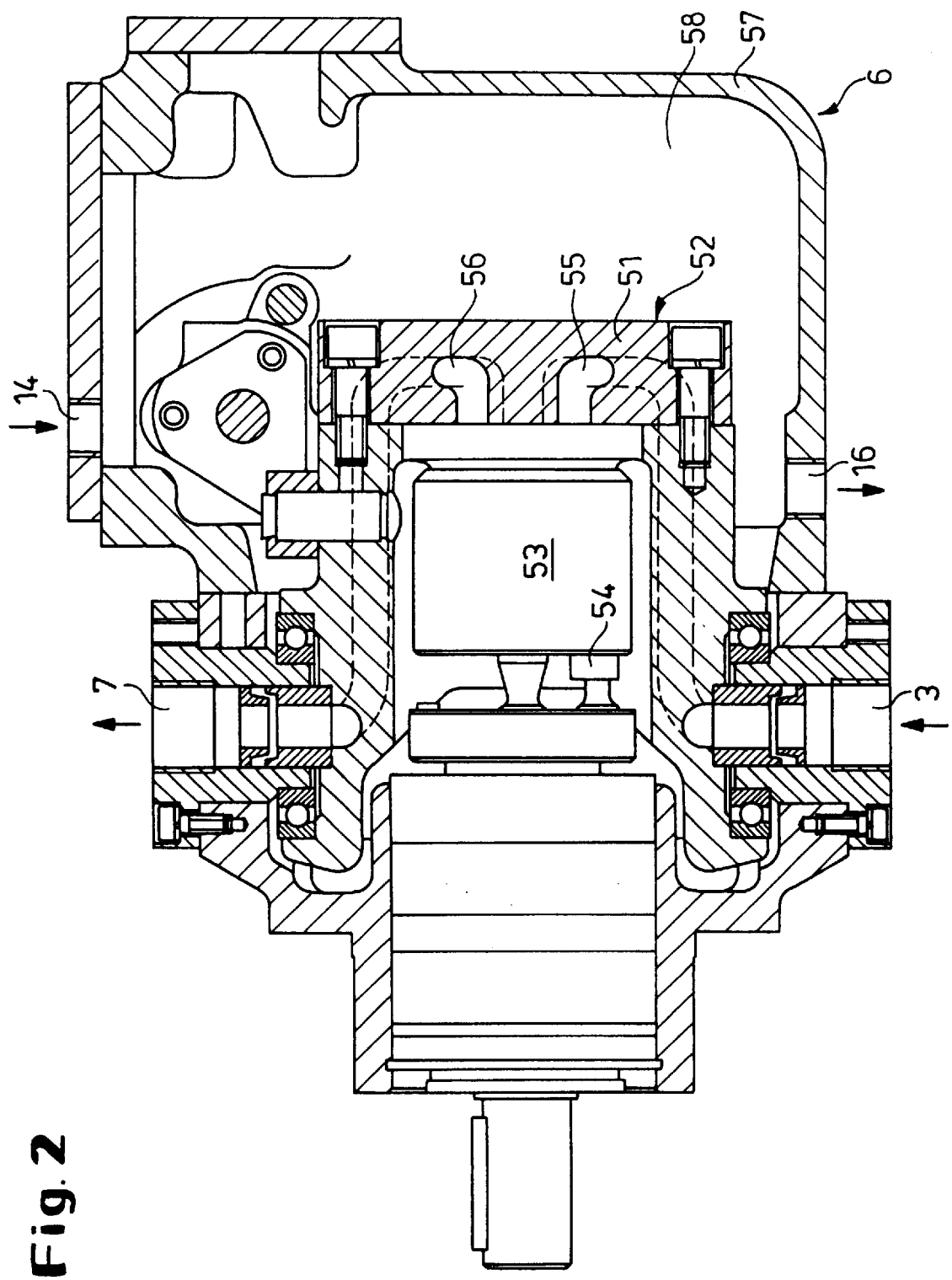
FIG. 2 shows a detailed section, on an enlarged scale, of a metering pump.

In FIG. 1, a feed line 3 leads from a reservoir tank 2 for component A (e.g., isocyanate), which is connected to a temperature control apparatus 1, via a pre-pressure pump 4 and via a non-return valve 5 to a metering pump 6 (see FIG. 2). From this, a feed line 7, which also contains a non-return valve 8, leads to a reversing valve 10, which is arranged immediately upstream of a mixing unit 9 and constructed as a three-way valve. From the reversing valve 10, a circulating line 11 leads back to the reservoir tank 2. From the feed line 3, a bypass line 13, which bypasses the metering pump 6 and has a shut-off valve 12, branches off between the non-return valve 5 and the metering pump 6 and merges into the line 7. Furthermore, a branch line 14 branches off upstream of the metering pump 6 (See FIG. 2) and leads into the intermediate space 58 formed between the metering component 52 and the housing 57 of the metering pump 6, and from this via a return line 16 provided with a pressure relief valve 15 into the circulating line 11. Another bypass line 17 branches off from the feed line 7 downstream of the non-return valve 8 and merges via a shut-off valve 18 into the circulating line 11. The pre-pressure pump 4, the metering pump 6 and the reversing valve 10 are connected via pulse lines 19, 20, 21 to a control apparatus 22. Further pulse lines 23, 24 connect the control apparatus 22 to the shut-off valve 12 and the shut-off valve 18. A mold, not shown, is assigned to the outlet 25 of the mixing unit 9.

Component B (e.g., polyol) is likewise stored in a reservoir tank 27 provided with a temperature control apparatus 26. A feed line 28 leads from the reservoir tank 27 via a feed pump 29 and non-return valve 30 to a hydraulically actuated reciprocating metering apparatus 31 with a metering piston 32. A feed line 33 leads from the reciprocating metering apparatus 31 via an adjustable non-return valve 34 to a reversing valve 35 which is arranged upstream of the mixing unit 9 and corresponds in construction to the reversing valve 10. A bypass line 36 leads from the feed line 33 via a shut-off valve 37 into a circulating line 38 which leads back from the reversing valve 35 into the reservoir tank 27. The control apparatus 22 is connected via pulse lines 39, 40, 41, 42 to the feed pump 29, the reciprocating metering apparatus 31, the reversing valve 35 and the shut-off valve 37.

In FIG. 2, the metering pump 6 comprises a metering component 52 which is surrounded by a capsule 51 and in which are arranged several metering pistons 54 on a rotor 53. The feed line 3 merges into a suction chamber 55 of this metering component 52, and during the metering times, the metering pistons 54 meter the component A made available into a pressure chamber 56, from which the feed line 7 leads away. The branch line 14 merges into the intermediate space 58 present between the metering component 52 or its capsule 51 and the actual housing 57 of the metering pump 6, and from this space 58, the return line 16 leads away and merges via the overflow valve 15 into the circulating line 11.

One of the many processes which can be implemented with the device according to FIGS. 1 and 2 proceed as follows:

After a relatively long standstill time, such as, for example, after an overnight standstill, some minutes of preconditioning to the operating state are first required. When this operating state with preconditioning of the device has been reached, the device is, during operating time, composed of recurring idle times and metering times (shot times).

During the idle times, the pre-pressure pump 4 now conveys the temperature-controlled component A partly via the feed line 3 and the branch line 14 into the space 58 of the stationary metering pump 6, and this passes via the return line 16 and the circulating line 11 into the reservoir tank 2. The other portion is conveyed via the bypass line 13 into the feed line 7, via the non-return valve 8 and reversing valve 10, and further via the circulating line 11 into the reservoir tank 2. During this procedure, the feed pump 29 conveys component B through the reciprocating metering apparatus 31, the metering piston 32 of which is withdrawn, via the non-return valve 34 of the feed line 33 and the reversing valve 35 via the circulating line 38 back into the reservoir tank 27. By this mode of operation, the device is kept at its conditioning to the operating pressure and operating temperature during the idle times.

When a shot is now pending, the metering pump 6 receives, via the pulse line 20, the command to operate, while the shut-off valve 12 of the bypass line 13 and the shut-off valve 18 of the bypass line 17 is closed. Some of the component A made available is still conveyed via the branch line 14 through the intermediate space 58 in the metering pump 6 via the return line 16 to the reservoir tank 2. Now, however, the metering pump 6 conveys the other portion via the feed line 7 and the circulating line 11 back into the reservoir tank 2. After a few seconds, during which the shot conditions have built up in the system, the reversing valve 10 receives the command to open into the mixing unit 9. The metering pump 6 now meters the shot into the mixing unit 9 for the time determined by the control apparatus 22.

Component B of the device operates similarly. The feed pump 29 receives the command to stop, while the shut-off valve 37 closes the bypass line 36. Thereafter, the metering piston 32 conveys component B into the feed line 33 and via the reversing valve 35 into the circulating line 38 up to the reservoir tank 27. At the same time as the reversal of the reversing valve 10, reversing valve 35 also receives the command to open into the mixing unit 9. It remains open exactly as long as the reversing valve 10, that is to say until the shot has ended. It goes without saying that the commands of the two component sides must be coordinated with one another.

After the shot, the reversing valves 10, 35 receive the command to reverse, and in particular the reversing valve 10 now connects the feed line 7 to the circulating line 11; in the same manner, the reversing valve 35 now connects the feed line 33 to the circulating line 38, so that the components are conveyed back in circulation into the reservoir tanks 2, 27. The metering piston 32 receives the command to withdraw. On the side of component A, however, the metering pump 6 simultaneously receives the command to discontinue operation, and the shut-off valve 12 in the bypass line 13 opens to re-establish the circulation for the portion of component which is not conveyed through the intermediate space 58. The shut-off valves 18 and 37 are open. After the given idle time, the command for the next metering operation or shot comes from the control apparatus 22.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurethane moldings by the shot process comprising the steps of:
    a) simultaneously metering of at least one isocyanate component and at least one polyol component into a mixing unit;
    b) mixing said at least one isocyanate component with said at least one polyol component with one another in predetermined amounts during the shot times to form a mixture; and
    c) introducing said mixture into a mold; wherein said at least one isocyanate or polyol component is being metered into the mixing unit with a metering pump comprising a metering component and housing during the shot times, and during the idle time, said at least one isocyanate or polyol component is being conveyed in circulation; wherein a pre-pressure pump upstream of said metering pump operates during the entire operating time and conveys an excess larger amount of said at least one isocyanate or polyol component than is required by the metering pump during the metering times; a portion of said at least one isocyanate or polyol component being circulated during the entire operating time through an intermediate space formed between said metering component and said housing of said metering pump.

2. A process according to claim 1, wherein during the metering times, a smaller amount of said at least one isocyanate or polyol component made available is conveyed in circulation through said intermediate space in said metering pump than by comparison during the idle times.

3. A process according to claim 1 wherein said portion of said at least one isocyanate or polyol component made available is circulated in a bypass loop located past the metering pump.

4. A process according to claim 1, wherein said at least one isocyanate or polyol component made available is completely fed through said intermediate space in said metering pump in the idle times.

5. A process according to claim 3, wherein said portion of said at least one isocyanate or polyol component made available is circulated in said bypass loop during the idle times.

6. A process according to claim 1, wherein said metering pump only operates during the metering times.

7. A device for the production of polyurethane moldings in a mold produced from at least one isocyanate component and at least one polyol component by the so-called shot process comprising for each component:
    a) a reservoir tank,
    b) a feed line leading from said reservoir tank comprising a metering unit and a valve to a mixing unit, at least one of said metering units comprising a metering pump,
    c) a circulating line leading back from said valve to said reservoir tank, wherein said metering unit is connected to said mixing unit by said valve during the shot times, d) a mold downstream of said mixing unit and a control apparatus for regulating valves and pumps wherein a pre-pressure pump which operates continuously during the operating time is arranged upstream of said metering pump, and a branch line of said feed line leading to said metering pump leads into an intermediate space formed between said metering component and said housing of said metering pump and merges from this housing into a return line.

8. A device according to claim 7, wherein said valve is a reversing valve.

9. A device according to claim 7, wherein a bypass line which bypasses said metering pump branches off from said feed line leading to said metering pump and merges into the feed line exiting said metering pump.

10. A device according to claim 7, wherein a second valve which can be controlled by said control apparatus is located in said bypass line.

11. A device according to claim 7, wherein said metering pump comprises a gear pump, a spiral pump or a high-speed axial reciprocating pump or radial reciprocating pump.

* * * * *